United States Patent Office 3,313,840
Patented Apr. 11, 1967

3,313,840
PROCESS FOR THE PRODUCTION OF THE DINITRILES OF FUMARIC ACID AND MALEIC ACID
Christian Kosel, Grossauheim, and Theodor Lüssling, Hanau am Main, Germany, assignors to Deutsche Gold- und Silber-Scheideanstalt vormals Roessler, Frankfurt am Main, Germany
No Drawing. Filed Dec. 7, 1964, Ser. No. 416,621
Claims priority, application Germany, Dec. 11, 1963, D 43,133
9 Claims. (Cl. 260—465.8)

The present invention relates to an improved process for the production of the dinitriles of fumaric and maleic acids by the catalytic dehydration of succinic acid dinitrile in the presence of oxygen.

It is known that the dinitriles of fumaric acid and maleic acid can be produced by the cleavage of water from the corresponding diamides. Phosphorus pent oxide, for example, can be used as a dehydrating agent. Considerable quantities of a carbonized residue are obtained in this reaction which can only be removed from the reaction vessel with great difficulty.

Furthermore, there is a reference in literature to the effect that succinic acid dinitrile can be converted to a mixture of the dinitriles of fumaric acid and maleic acid by oxidation with air or by a catalytic dehydrogenation (Angewandte Chemie, 61, 239, 1949). However, no further information is given in such literature as to the possible ways such reactions can be carried out. Also, no technical process based thereon has become known up to the present time.

According to the invention it was found that the dinitriles of fumaric acid and maleic acid could be obtained in practical yields by the catalytic dehydrogenation of succinic acid dinitrile if such catalytic dehydration is carried out at high temperatures in the presence of at least one oxide which is stable at the reaction temperature of an element of Groups Vb and VIb of the periodic system and furthermore in the presence of oxygen or air, preferably in diluted form. If desired, the mixture of dinitriles obtained can be separated by known methods, such as fractional distillation, recrystallization or sublimation.

In the reaction according to the invention both of the cis-trans isomers of the unsaturated dinitrile are formed. In addition, the reaction mixture can still contain unreacted succinic acid dinitrile. It can be used as such for the manufacture of vitamin $B_6$ but, as indicated above, it can, if desired, be separated into its components. Fractional distillation of the reaction mixture at pressure between about 36 and about 150 torr and preferably between about 50 and 90 torr while maintaining a temperature in the reflux condenser above the melting point of the fumaric acid dinitrile has proved especially suited for such separation.

The conversions attained with the process according to the invention, depending upon the load on the catalyst and the reaction temperature, can be up to about 65%. The combined yields of the dinitriles of fumaric acid and maleic acid can be over 70% with reference to the succinic acid dinitrile converted. The dinitriles are produced in a practically constant ratio of fumaric acid dinitrile to maleic acid dinitrile of 5:4.

An advantage of they process according to the invention is that it can be carried out at atmospheric pressure. It, however, is also possible to carry it out under sub- or super-atmospheric pressures.

The oxides mentioned as catalysts can be used individually or as mixtures. Vanadium pentoxide, molybdenum trioxide and, particularly, chromium (III) oxide are especially suited catalytic oxides.

It, furthermore, was found advantageous to add a small quantity of an alkali metal hydroxide to the oxidic catalyst as such addition causes a manifold increase in the life of the catalyst. Of the alkali metal hydroxides those of potassium, rubidium and caesium are preferred. It is advantageous to employ about 0.3 to1.5 parts by weight of alkali metal hydroxide per 10 to 20 parts by weight of the oxidic catalyst. It furthermore is advantageous to employ the catalyst in the form of a supported catalyst in which the catalytically active components are deposited on a suitable known carrier. Silica containing materials and especially shaped silica gel are particularly adapted as carriers.

The supported catalysts can, for example, be produced by impregnating the carrier with an aqueous solution of a compound of a metal of Group Vb or VIb and an alkali metal compound. The compound selected being such that after the subsequent drying and heating of the impregnated carrier the metal of group Vb or VIb supplied is in the form of its oxide and the alkali metal is either in the form of its hydroxide or oxide. If it is in the latter form it will be quickly converted to the hydroxide during use of the catalyst by the water formed during the reaction or added to the reactants. The drying of the impregnated carrier can be effected, for example, at about 110° C.– 120° C. and the dried impregnated carried can then be heated, for example, to 450 to 500° C. for ten hours under air.

During use the catalyst becomes loaded with carbonization products produced during the dehydrogenation reaction which causes the conversion attained to decrease after a certain period of time. Such catalyst, however, can be completely regenerated by treatment with air at temperatures between 450 and 650° C.

The catalyst can be used as a fixed bed in a tube furnace but it also can be used in the form of a fluidized bed.

It was furthermore found according to the invention that it is advantageous to carry out the dehydrogenation in the presence of small amounts of added water. Surprisingly the presence of water does not disturb the dehydrogenation and has a favorable influence upon the reaction as a diluent.

The succinic acid dinitrile used as a starting material can be supplied in the melted state. It is more advantageous, however, if it is supplied as a mixture with water in a ratio of the dinitrile to water of 14:1 by weight. This is the eutectic mixture which has a melting point of about 20°C.

It was found expedient to employ the oxygen in diluted form as this permits the strong exothermic reaction to be controlled more readily. For example, an oxygen containing gas containing 2 to 10 vol. percent of oxygen can be employed. For instance, air can be mixed with an inert gas, such as nitrogen, in a volume ratio of 1:1 to 1:10. Preferably the diluting gas is recycled exhaust gas from the reaction which can be saturated with water vapor depending upon the method employed for the recovery of the reaction products therefrom.

The molar ratio of succinic acid dinitrile to oxygen preferably should be maintained between 1:0.25 to about 1:1.

The reaction is expediently carried out at temperatures between about 270° and 600° C. and preferably between about 450° and 550° C.

In order that the thermal decomposition of the heat sensitive dinitriles produced be avoided as much as possible, it is expedient that the reaction mixture only remain in the heated reaction zone for short periods of time up to about 15 seconds and preferably only about 0.1 to 2 seconds.

As ammonia is formed as a by-product of the reaction according to the invention and as the dinitriles of fumaric acid and maleic acid tend to resinify quickly in a basic medium, it is to be recommended that the reaction gases be neutralized or weakly acidified. For example, the reaction gases can be cooled down with a liquid containing an acid, preferably, phosphoric acid. Such cooling can be carried out in an effective cooling apparatus which exerts a good scrubbing effect. It was found most expedient to effect such cooling in a so-called quencher. The dinitriles separate out as an oily phase in the quencher and are then separated from the aqueous quenching medium. The separation of the dinitriles is effected after the water has been removed from such oily phase, for example, by azeotropic distillation with chloroform. The separation of the dinitriles is effected as already described above by fractional distillation, recrystallization or sublimation. The unreacted succinic acid dinitrile which is recovered can be recycled.

The following examples will serve to illustrate the present invention with reference to several embodiments thereof.

Example 1

600 g. of silica gel rods 8 mm. long and 3 mm. in diameter were impregnated with an aqueous solution of 150 g. of chromic anhydride and 6 g. of KOH. After drying at 120° C. the impregnated silica gel was heated for ten hours at 450° C.

The resulting catalyst (1 liter) was placed in a reactor 2.0 meters long and 25 mm. in diameter and heated to 450° C. with the aid of a salt bath. 360 g./h. of a mixture of 336 g. of succinic acid dinitrile and 24 g. of water together with 267 Nl./h. of air and 2300 Nl./h. of recycled exhaust gas after preheating were then passed through the catalyst in the reactor. The reaction gases leaving the reactor were introduced into a quencher in which they were cooled down with acid recycled water which had been acidified with phosphoric acid. The main quantity of the dinitrile separated out as an oil in the quencher. The remainder which left the quencher in the form of a fog in the exhaust gas was recovered by scrubbing it out in two wash bottles. The catalyst was regenerated after each five hours' operation by treatment with air diluted with inert exhaust gas at 450 to 600° C.

The oily mixture of the reaction products and unconverted succinic acid dinitrile was separated off from the aqueous phase and the retained water entrained azeotropically with chloroform. Thereafter pure fumaric acid dinitrile and pure maleic acid dinitrile were recovered from the dried oily reaction mixture by fractional distillation at a pressure between 50 and 90 torr. The distillation residue consisted of unconverted succinic acid dinitrile which could be recycled.

The conversion of succinic acid dinitrile was 57.4%. The yield with reference to the quantity of succinic acid dinitrile converted was 38.9% of fumaric acid dinitrile and 31.7% of maleic acid dinitrile or a total yield of 70.6% of the mixture. The space time yield was 113 g. per liter of catalyst per hour.

Example 2

The dehydrogenation of succinic acid dinitrile was carried out as described in Example 1 except that the catalyst was only regenerated after each 20 hours' operation. The conversion of the succinic acid dinitrile was 48.7%. The yield with reference to the quantity of succinic acid dinitrile converted was 39.6% of fumaric acid dinitrile and 32.8% of maleic acid dinitrile or a total yield of 72.4%. The space time yield was 108 g. per liter of catalyst per hour.

Example 3

680 g./h. of a 14:1 succinic acid dinitrile water mixture and 501 Nl./h. of air were supplied to the reactor as described in Example 1 which also was heated with a salt bath at 450° C. In addition, 1320 Nl./h. of exhaust gases were recycled through the apparatus. The catalyst was regenerated periodically after 5 hours' operation. The yield with reference to the quantity of succinic acid dinitrile converted (57.1%) was 39.0% of fumaric acid dinitrile, 29.6% of maleic acid dinitrile or a total yield of 68.6%. The space time yield was 201 g. per liter of catalyst per hour.

Example 4

Succinic acid dinitrile was catalytically dehydrogenated as in Example 1 except that only 1080 Nl./h. of exhaust gas was recycled.

The conversion was 63.0% and the yields of fumaric acid dinitrile and maleic acid dinitrile respectively were 35.9% and 28.7% or a total of 64.6% based on the quantity of succinic acid converted. The space time yield was 114 g. per liter of catalyst per hour.

Example 5

The process of Example 1 was carried out with the quantities of the materials given in Example 3 at a salt bath temperature of 470° C.

The conversion was 62.1% and the yields of fumaric acid dinitrile and maleic acid dinitrile respectively based on the succinic acid dinitrile converted were 35.4% and 25.6% or a total of 61.0%. The space time yield was 180 g. per liter of catalyst per hour.

Example 6

A catalyst was prepared by impregnation of 80 g. of silica gel rods about 8 mm. long and 3 mm. in diameter with an aqueous solution of 15 g. of chromic anhydride, 3 g. of ammonium molybdate and 0.7 g. of potassium hydroxide followed by drying at 120° C. and heating for 10 hours at 450° C.

The resulting catalyst (115 ml.) was placed in a reactor 135 mm. and 33 mm. in diameter and heated to 410° C. with the aid of a salt bath. 31 g./h. of a 14:1 succinic acid dinitrile water mixture, 20.4 Nl./h. of air and 138 Nl./h. of recycled exhaust gas were passed through the catalyst in the reactor. The catalyst was regenerated after each six hours' operation.

The conversion was 63.2% and the yields of fumaric acid dinitrile and maleic acid dinitrile respectively based upon the succinic acid dinitrile converted were 29.1% and 19.6% or a total of 48.7%. The space time yield was 70 g. per liter of catalyst per hour.

Example 7

A catalyst was prepared by impregnating 80 g. of silica gel rods with a hot aqueous solution of 2 g. of chromic anhydride, 14 g. of ammonium metavanadate and 1 g. of potassium hydroxide followed by drying at 120° C. and heating for 10 hours at 450° C.

The resulting catalyst was placed in a reactor as described in Example 6 and heated to 290° C. with the aid of a salt bath. 30 g./h. of succinic acid dinitrile, 21 Nl./h. of air and 108 Nl./h. of nitrogen were passed through the catalyst in the reactor. The catalyst was regenerated after each six hours' operation.

The conversion was 61.2% and the yields of fumaric acid dinitrile and maleic acid dinitrile respectively based upon the succinic acid dinitrile converted were 15.7% and 8.2% or a total of 23.9%. The space time yield was 35 g. per liter of catalyst per hour.

We claim:

1. In a method of producing a mixture of fumaric acid dinitrile and maleic acid dinitrile by dehydrogenation of succinic acid dinitrile the steps of passing a mixture of succinic acid dinitrile with an inert gas containing 2 to 10% of elemental oxygen over a catalyst essentially consisting of at least one oxide selected from the group consisting of vanadium pentoxide, molybdenum trioxide and chromium (III) oxide as active catalyst component in a heated reaction zone maintained at a temperature between 270 and 600° C., the molar ratio of said succinic acid dinitrile to said oxygen being between about 1:0.25 and about 1:1, the time the reaction mixture remains in the heated reaction zone being up to 15 seconds, and rendering the reaction gases leaving the heated reaction zone neutral to weakly acid.

2. The method of claim 1 in which the time the reaction mixture remains in the heated reaction zone is 0.1 to 2 seconds.

3. The method of claim 1 in which the temperature of the heated reaction zone is between 450 and 550° C.

4. The method of claim 1 in which said active catalyst component is supported on a siliceous carrier.

5. The method of claim 1 in which said catalyst essentially consists of at least one oxide selected from the group consisting of vanadium pentoxide, molybdenum trioxide and chromium (III) oxide as active catalyst component and 0.3 to 1.5 parts by weight of an alkali metal hydroxide per 10 to 20 parts by weight of catalytically effective oxide.

6. The method of claim 2 in which the reaction mixture leaving the heated reaction zone is rapidly cooled to condense the dinitrile contained therein.

7. The method of claim 6 in which said rapid cooling is effected by quenching with an aqueous liquid in the presence of a quantity of acid sufficient to render the reaction mixture neutral to weakly acid.

8. The method of claim 7 in which said acid is phosphoric acid.

9. The method of claim 1 in which said catalyst essentially consists of chromium (III) oxide supported on a siliceous carrier.

References Cited by the Examiner
FOREIGN PATENTS
1,127,890  4/1962  Germany.

OTHER REFERENCES
Bayer: Angewandte Chemie, vol. 61, p. 239 (1949).

CHARLES B. PARKER, *Primary Examiner.*

JOSEPH P. BRUST, *Assistant Examiner.*